United States Patent Office 2,803,632
Patented Aug. 20, 1957

2,803,632
SYNTHESIS OF STEROIDS

Lloyd B. Barkley, Brentwood, Mo., assignor to Monsanto Chemical Company, St. Louis, Mo., a corporation of Delaware No Drawing. Application September 24, 1954, Serial No. 458,285

7 Claims. (Cl. 260—340.9)

This invention relates to methods and novel compounds useful in the synthesis of steroids. More particularly this invention relates to methods and novel compounds useful in the synthesis of a member of the cyclopentanodimethylpolyhydrophenanthrene series, namely a 17-formylcyclopentano-10,13-dimethyl-$\Delta^{4,9(11)}$ - decahydrophenanthren-3-one

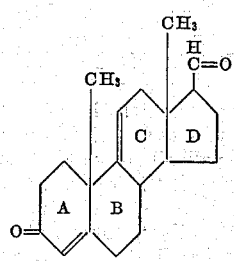

such as $\Delta^{9(11)}$-21-norprogesterone. In particular this invention relates to methods and novel compounds useful in the synthesis of 3-[2-(1,3-dioxacyclophentanyl)]-3a,6-dimethyl-6-($\beta$-carboxyethyl)-7-keto-$\Delta^5$ - decahydropentanthrene.

In the synthesis of members of the cyclopentanodimethylpolyhydrophenanthrene series from fused carbocyclic tricyclic compounds of the polyhydrophenanthrene series in order to form ring A it was found necessary heretofore to block off (or protect) the 3-carbon atom of the polyhydrophenanthrene compound, which operation required additional time consuming and expensive steps which materially reduced the efficiency of the overall synthesis. In accordance with this invention it has been found that members of the cyclopentanodimethylpolyhydrophenanthrene series can be readily synthesized from fused carbocyclic tricyclic compounds having the same fused ring carbon atom arrangement as those of the polyhydrophenanthrene series employed heretofore but wherein one of the terminal fused rings is a cyclopentano group without blocking off (or protecting) any ring carbon atom. Such fused carbocyclic tricyclic compounds are termed herein as polyhydropentanthrene compounds. The ring carbon atom of the polyhydropentanthrene compound corresponding to the 3-carbon atom substituent of the corresponding polyhydrophenanthrene compound is that of position 8.

The sequence of steps or series of reactions proceeding to the 17 - formyl-cyclopentano-10,13-dimethyl-$\Delta^{4,9(11)}$-decahydrophenanthren-3-one for purposes of this invention is outlined schematically in the following diagram. The compounds of the following diagram represented by V, VI, VII and VIII are described in my co-pending application Serial No. 436,722, filed June 14, 1954, of which application is a continuation-in-part.

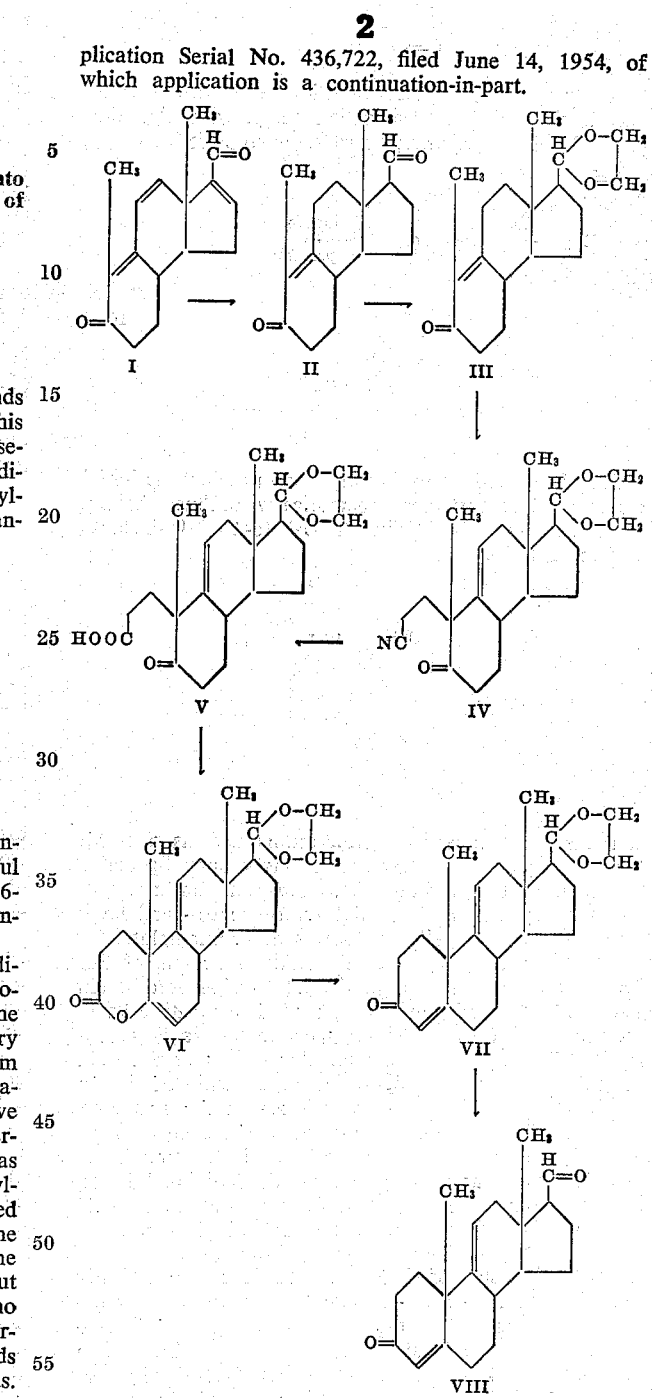

As indicated by the foregoing diagram a member of the cyclopentanodimethylpolyhydrophenanthrene series, namely, 17 - formylcyclopentano-10,13-dimethyl-$\Delta^{4,9(11)}$-decahydrophenanthren-3-one is obtained from a fused carbocyclic tricyclic compound by a relatively simple synthesis.

The initial reactant of the process outlined in the foregoing diagram, namely, 3-formyl-3a,6-dimethyl-7-keto-$\Delta^{2,4,5a(6)}$-hexahydropentanthrene (Compound I), may be prepared by a variety of methods. For example, by a series of reactions comprising the mono-ozonolysis of a 1,8a-dimethyl-$\Delta^{6,9,10a(1)}$-octahydrophenanthren-2-one

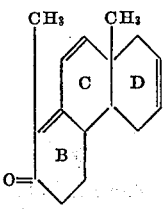

followed by reductive decomposition (e. g. with zinc dust and acetic acid) and cyclization (e. g. with piperidine acetate), which steps may be represented as follows

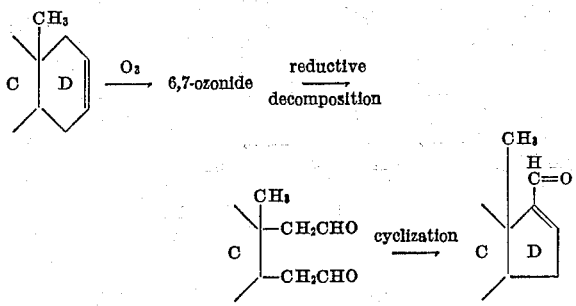

As will be obvious to those skilled in the art the initial reactant of the process schematically outlined herein, namely, 3 - formyl-3a,6-dimethyl-7-keto-$\Delta^{2,4,5a(6)}$-hexahydropenthantrene

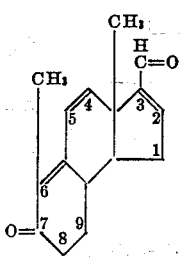

contains 3 asymmetric carbon atoms and as a result thereof may exist in the form of eight optically active isomers or four racemates, i. e. anti-trans, anti-cis, syn-trans and syn-cis racemic mixtures of dextro- and levo-rotatory isomers. All such forms are contemplated as coming within the scope of the initial reactants of this invention. The notations "anti" and "syn" as used herein indicate the spatial configuration of H at position 9a in the structural formula with respect to the 1a H substitnent. The notations "cis" and "trans" as used herein indicate the spatial configuration relationship of the 3a CH3 group and the 1a H substituent in the structural formula. It is to be understood that where no notation appears, that the compound is to be interpreted in its generic sense, that is as representing the individual dextro and levo isomers in separated form as well as racemic mixtures thereof or isomeric racemic mixtures of same or the total unresolved mixture of isomers.

In the first step of the process outlined schematically herein 3 - formyl - 3a,6 - dimethyl - 7 - keto - $\Delta^{5a(6)}$-decahydropentanthrene (Compound II) is prepared by the addition of two molecules of hydrogen to the 2:3-double bond and the 4:5-double bond respectively, of 3-formyl-3a,6 - dimethyl - 7 - keto - $\Delta^{2,4,5a(6)}$ - hexahydropentanthrene (Compound I). This step is conveniently carried out by the method comprising passing hydrogen into a solution of 3-formyl-3a,6-dimethyl-7-keto-$\Delta^{2,4,5a(6)}$-hexahydropenthrene containing dispersed therein a palladium catalyst until two molar equivalents of hydrogen are absorbed. The quantity of catalyst employed may be any amount which is sufficient to catalyze the reaction. While metallic palladium is operable, it is preferred that palladium be distributed on a suitable carrier such as activated carbon, alumina, diatomaceous earth, silica, barium sulfate, strontium carbonate, calcium carbonate, magnesium carbonate, and the like, and suspended in the reaction medium. The hydrogenation is best conducted in a liquid medium, as for example in the presence of an inert organic solvent incaapble of being hydrogenated under the reaction conditions. Examples of such are benzene, toluene, xylene, ethyl benzene, cyclohexane, the liquid alkanes, lower aliphatic alcohols, acetone, butanone, etc. The lower aliphatic alcohols, i. e. methanol, ethanol, isopropanol and butanol, are particularly preferred. The hydrogenation is usually carried out at approximately atmospheric pressure, however, super- or sub-atmospheric pressures may be employed. Although temperatures in the range of 0° C. to about 50° C. are particularly convenient, higher or lower temperatures may be employed. The extent of the hydrogenation may be readily followed by observing the decrease in pressure in the system as the hydrogen is absorbed. Ordinarily the hydrogenation is continued until hydrogen has been absorbed in an amount corresponding to that theoretically required to convert the 3 - formyl - 3a,6 - dimethyl - 7 - keto - $\Delta^{2,4,5a(6)}$ - hexahydropentanthrene to 3 - formyl - 3a,6 - dimethyl - 7-keto-$\Delta^{5a(6)}$-decahydropentanthrene.

As illustrative of the preparation of a 3-formyl-3a,6-dimethyl-7-keto-$\Delta^{5a(6)}$-decahydropentanthrene is the following:

*Example I*

Approximately 20 parts by weight of *dl*-anti-trans-3-formyl - 3a,6 - dimethyl - 7 - keto - $\Delta^{2,4,5a(6)}$ - hexahydropentanthrene (M. P. 132–133° C.) is admixed in a suitable reaction vessel with approximately 200 parts by weight of isopropanol, approximately 2 parts by weight of 10% aqueous sodium hydroxide, and approximately 2.4 parts by weight of a 2% palladium-strontium carbonate catalyst (which had been previously reduced). While agitating, gaseous hydrogen is passed into the mixture at about 25° C. at a pressure slightly above atmospheric. Upon absorption of substantially two molar equivalents of hydrogen, the catalyst is filtered off and the filtrate neutralized with dilute acetic acid and then subjected to vacuum distillation. The oily residue is *dl*-anti-trans-3-formyl-3a,6-dimethyl-7-keto-$\Delta^{5a(6)}$-decahydropentanthrene.

In the second step of the process outlined schematically herein the mono-ethylene ketal (Compound III), namely, 3 - [2 - (1,3 - dioxacyclopentanyl)] - 3a,6 - dimethyl-7-keto-$\Delta^{5a(6)}$-decahydropentanthrene, is prepared by condensing 3 - formyl - 3a,6 - dimethyl - 7 - keto - $\Delta^{5a(6)}$ - decahydropentanthrene with an equimolecular amount of ethylene glycol in the presence of an acid condensation catalyst. It is preferable that the condensation take place at a temperature in the range of about 50 to 100° C. and in the presence of an inert solvent, e. g. benzene, dioxane, ethylene dichloride, etc. As illustrative of this process step is the following:

*Example II*

Approximately 12 parts by weight of *dl*-anti-trans-3-formyl - 3a,6 - dimethyl - 7 - keto - $\Delta^{5a(6)}$ - decahydropentanthrene of Example I is dissolved in 750 parts by weight of ethylene dichloride. Thereto is added and intimately mixed about 3.3 parts by weight of ethylene glycol and approximately 0.36 part by weight of p-toluene sulfonic acid monohydrate. The reaction mass is brought to reflux and the ethylene dichloride-water azeotrope slowly distilled off. Thereafter the mass is cooled, washed with aqueous potassium carbonate, and the washings collected. The collected washings are extracted with ethylene dichloride, and the extracts dried over magnesium sulfate. The so dried extracts are then subjected to vacuum distillation. The oily residue is slurried with methanol and upon standing gives up white crystals of the mono-ethylene ketal of *dl*-anti-trans-3-formyl-3a,6-dimethyl-7-keto-Δ⁵ᵃ⁽⁹⁾-decahydropentanthrene

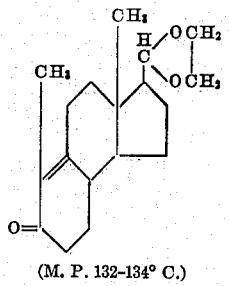

(M. P. 132–134° C.)

In the third step of the process outlined schematically herein the mono-ethylene ketal (Compound III) is converted to 3 - [2 - (1,3 - dioxacyclopentanyl)] - 3a,6-dimethyl - 6 - (β - cyanoethyl) - 7 - keto - Δ⁵ - decahydropentanthrene. In its preparation a new asymmetric center is introduced and thus a mixture of stereoisomers results. This mixture is preferably not isolated but converted directly by vigorous base hydrolysis to the corresponding carboxyethyl derivative (Compound V). The carboxyethyl derivative so obtained is a mixture of isomeric keto acids, which isomers for purposes of this invention may be represented structurally and identified as follows:

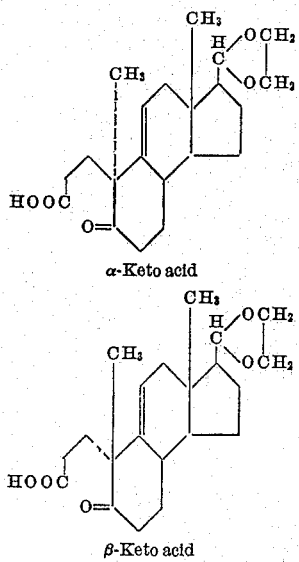

α-Keto acid

β-Keto acid

Although both of the isomeric α- and β-keto acids may be converted to a tetracyclic ketone of the general structure of Compounds VI, VII and VIII of the diagram set forth hereinbefore the β-keto acid as identified herein produces a tetracyclic ketone of the perhydrocyclopentanophenanthrene series whose angular methyl groups are on the same side of the cyclopentanophenanthrene reference plane while the α-keto acid provides a tetracyclic ketone whose angular methyl groups are on opposite sides.

As illustrative of the preparation of such keto acid is the following:

*Example III*

To a suitable reaction vessel containing 29 parts by weight of the mono-ethylene ketal of Example II dissolved in 500 parts by weight of dioxane is added and intimately mixed 5.8 parts by weight of acrylonitrile and 5 parts by weight of 40% aqueous benzyl trimethyl ammonium hydroxide. The air of the system is replaced by nitrogen and the reaction mix allowed to stand at room temperature for about 64 hours. The system is then subjected to vacuum distillation to remove the solvent. The residue is then taken up with 500 parts by weight of ethylene chloride, washed with water and dried over magnesium sulfate. The so dried solution is then subjected to vacuum distillation and the residue so obtained, which consists chiefly of a mixture of stereoisomers of the mono-ethylene ketal of *dl*-anti-trans-3-formyl - 3a,6 - dimethyl - 6 - (β - cyanoethyl) - 7 - keto-Δ⁵-decahydropentanthrene, is refluxed with 1000 parts by weight of 10% aqueous sodium hydroxide for about 18 hours. The resultant solution is then extracted with diethyl ether and the aqueous layer is then acidified with 10% sulfuric acid. The precipitate filtered off is found to be the white crystalline α-isomer of *dl*-anti-trans-3-[2 - (1,3 - dioxacyclopentanyl)] - 3a,6 - dimethyl - 6- (β - carboxyethyl) - 7 - keto - Δ⁵ - decahydropentanthrene (M. P. 156–159° C.). The filtrate contains the β-isomer of the keto acid, which upon isolating is found to be an oil.

The next step in the method of this invention is the conversion of the keto acid (Compound V) to the enol lactone (Compound VI) by boiling the former with acetic anhydride in the presence of a small amount of sodium acetate. As illustrative of this step is the following:

*Example IV*

10 parts by weight of the β-form of *dl*-anti-trans-3-[2-(1,3 - dioxacyclopentanyl)]-3a,6-dimethyl - 6 - (β-carboxyethyl)-7-keto-Δ⁵-decahydropentanthrene is admixed with 250 parts by weight of anhydrous sodium acetate and 0.5 part by weight of acetic anhydride and the mixture refluxed for about 4 hours in an atmosphere of nitrogen. The acetic anhydride is then removed under reduced pressure and the residue taken up with diethyl ether. The ether solution is then washed with aqueous sodium bicarbonate and then with water. The ether is then removed under reduced pressure, the residue consisting of the oily mono-ethylene ketal of *dl*-3-keto-4-oxa-17-formyl-Δ⁵,⁹⁽¹¹⁾-androstadiene.

Employing the α-isomer of *dl*-anti-trans-3-[2-(1,3-dioxacyclopentanyl)]-3a,6-dimethyl - 6 - (β-carboxyethyl)-7-keto-Δ⁵-decahydropentanthrene in place of the β-isomer of the keto acid an enol lactone of the structure of Compound VI is obtained as a white crystalline substance having a melting point of 147–150° C.

The next step in the method of this invention is the preparation of the mono-ethylene ketal of 17-formyl-cyclopentano-10,13-dimethyl - Δ⁴,⁹⁽¹¹⁾ - decahydrophenanthren-3-one (Compound VII) from the corresponding mono-ethylene ketal of 17-formyl-cyclopentano-10,13-dimethyl - 4 - oxa-Δ⁵,⁹⁽¹¹⁾ - decahydrophenanthren-3-one (Compound VI) by reacting the latter with a methyl magnesium halide in diethyl ether, decomposing the addition product with dilute mineral acid, and then treating the ether solubles with an alcohol solution of an alkali metal hydroxide. As illustrative of this step is the following:

*Example V*

To a solution of 29 parts by weight of the mono-ethylene ketal of *dl*-3-keto-4-oxa-17-formyl-Δ⁵,⁹⁽¹¹⁾-androstadiene obtained from the β-isomer of the keto acid of Example IV in 300 parts by weight of benzene and 1500 parts by weight of diethyl ether is added slowly approximately 15 parts by weight of methyl magnesium bromide in 200 parts by weight of diethyl ether while maintaining the temperature of the system at about −50° C. and under an atmosphere of nitrogen. Upon completion of the methyl magnesium bromide addition the mix is agitated at −50° C. for about 1½ hours. To the cold mix so obtained is added 1000 parts by weight of 20% acetic acid and the mix is allowed to warm to 0° C. The aqueous layer is separated and washed with several small portions of diethyl ether. The ether extracts are combined with the original organic layer and the ether evaporated. The residue is then taken up with methanol and thereto is added 30 parts by weight of sodium hydroxide dissolved in 300 parts by weight of water. The mix so obtained is refluxed in an atmosphere of nitrogen for about 2 hours. The mix is cooled and the methanol evaporated under vacuum. The residue is admixed with 500 parts by weight of water and then is extracted with diethyl ether. The ether extracts are combined and subjected to vacuum distillation. The oily residue is the monoethylene ketal of dl-$\Delta^{9(11)}$-dehydro-21-norprogesterone. Its infrared spectra is the same as that of the dextro-rotatory isomer described and claimed in my co-pending application Serial No. 436,722, filed June 14, 1954.

The next step is the conversion of the mono-ethylene ketal to the free 17-formyl compound which may be brought about by treating the mono-ethylene ketal (Compound VII) with acid and recovering 17-formyl-cyclopentano-10,13-dimethyl-$\Delta^{4,9(11)}$-decahydrophenanthren-3-one (Compound VIII). As illustrative of such is the following:

Example VI 1.0 parts by weight of the mono-ethylene ketal of dl-$\Delta^{9(11)}$-dehydro-21-norprogesterone is admixed with 50 parts by weight of acetic acid and 50 parts by weight of water. The mix so obtained is refluxed for about 1½ hours, poured into water, extracted with chloroform, washed with aqueous sodium bicarbonate, and followed by a water wash. The solution is dried over magnesium sulfate and subjected to vacuum distillation. The residue is oily dl-$9(11)$-dehydro-21-norprogesterone. Its infrared spectra is the same as that of the dextro-rotatory isomer described in my co-pending application Serial No. 436,722, filed June 14, 1954.

What is claimed is:

1. The process which comprises reacting 3-[2-(1,3-dioxacyclopentanyl)]-3a,6-dimethyl-7-keto-$\Delta^{5a(6)}$-decahydropentanthrene with acrylonitrile under alkaline conditions, subjecting the 6-($\beta$-cyanoethyl) derivative so obtained to vigorous alkaline hydrolysis, and acidifying the reaction mass.

2. The process which comprises reacting dl-anti-trans-3-[2-(1,3-dioxacyclopentanyl)]-3a,6-dimethyl-7-keto-$\Delta^{5a(6)}$-decahydropentanthrene with acrylonitrile under alkaline conditions, subjecting the 6-($\beta$-cyanoethyl) derivative so obtained to vigorous alkaline hydrolysis, and acidifying the reaction mass.

3. The process which comprises (a) reacting ethylene glycol with 3-formyl-3a,6-dimethyl-7-keto-$\Delta^{5a(6)}$-decahydropentanthrene in substantially equimolecular proportions in the presence of an acid condensation catalyst, (b) reacting the 3-[2-(1,3-dioxacyclopentanyl)]-3a,6-dimethyl-7-keto-$\Delta^{5a(6)}$-decahydropentanthrene so obtained with acrylonitrile under alkaline conditions, (c) subjecting the 6-($\beta$-cyanoethyl) derivative so obtained to vigorous alkaline hydrolysis, and (d) acidifying the reaction mass.

4. The process which comprises (a) reacting ethylene glycol with dl-anti-trans-3-formyl-3a,6-dimethyl-7-keto-$\Delta^{5a(6)}$-decahydropentanthrene in substantially equimolecular proportions in the presence of an acid condensation catalyst, (b) reacting the dl-anti-trans-3-[2-(1,3-dioxacyclopentanyl)]-3a,6-dimethyl-7-keto-$\Delta^{5a(6)}$-decahydropentanthrene so obtained with acrylonitrile under alkaline conditions, (c) subjecting the 6-($\beta$-cyanoethyl) derivative so obtained to vigorous alkaline hydrolysis, and (d) acidifying the reaction mass.

5. The process which comprises (a) reacting dl-anti-trans-3-formyl-3a,6-dimethyl-7-keto-$\Delta^{2,4,5a(6)}$-hexahydropentanthrene with two equimolecular proportions of hydrogen in the presence of palladium, (b) reacting the dl-anti-trans-3-formyl-3a,6-dimethyl-7-keto-$\Delta^{5a(6)}$-decahydropentanthrene so obtained with ethylene glycol in substantially equimolecular proportions in the presence of an acid condensation catalyst, (c) reacting the dl-anti-trans-3-[2-(1,3-dioxacyclopentanyl)]-3a,6-dimethyl-7-keto-$\Delta^{5a(6)}$-decahydrophenanthrene so obtained with acrylonitrile under alkaline conditions, (d) subjecting the 6-($\beta$-cyanoethyl) derivative so obtained to vigorous alkaline hydrolysis, and (e) acidifying the reaction mass.

6. As a new compound 3-[2-(1,3-dioxacyclopentanyl)]-3a,6-dimethyl-6-($\beta$-cyanoethyl)-7-keto-$\Delta^5$-decahydropentanthrene.

7. As a new compound dl-anti-trans-3-[2-(1,3-dioxacyclopentanyl)]-3a,6-dimethyl-6-($\beta$-cyanoethyl)-7-keto-$\Delta^5$-decahydropentanthrene.

References Cited in the file of this patent

Elsevier's Encyclopedia of Org. Chem., vol. 13, pp. 13–19 (1946), Elsevier Pub. Co., N. Y.

Chem. Abstracts, vol. 46, Index, p. 12611 (1952).